July 6, 1954  M. L. RAMBO  2,683,159
CATALYTIC SYNTHESIS OF HYDROCARBONS
Filed June 23, 1951
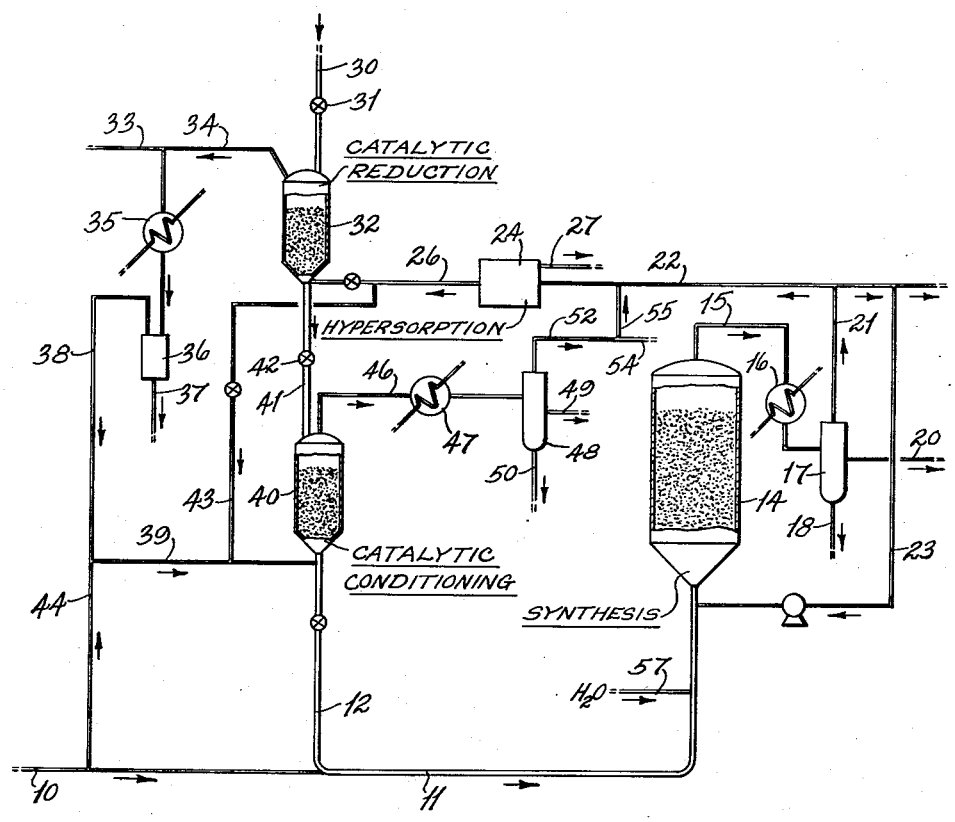
INVENTOR.
MARVIN L. RAMBO
BY
ATTORNEYS Patented July 6, 1954

2,683,159

UNITED STATES PATENT OFFICE 2,683,159

CATALYTIC SYNTHESIS OF HYDROCARBONS

Marvin L. Rambo, Fishkill, N. Y., assignor to The Texas Company, New York, N. Y., a corporation of Delaware Application June 23, 1951, Serial No. 233,160

3 Claims. (Cl. 260—449.6)

The present invention relates to the catalytic synthesis of hydrocarbons from synthesis gas comprising hydrogen and carbon monoxide, by contact with an iron catalyst, and is more particularly directed to the continuous production of improved yields of liquid hydrocarbons from a synthesis gas which is relatively poor in hydrogen, that is to say, containing from 0.3 to 1.3 mols of hydrogen per mol of carbon monoxide, and typical of $H_2$ and CO mixtures formed by generating the synthesis gas from carbonaceous materials low in hydrogen, such as coke, coal, fuel oil, and the like.

The present application is a continuation-in-part on my application, Serial No. 165,738, filed June 2, 1950, now abandoned.

In accordance with the present invention, a fresh, reduced, iron catalyst is initially conditioned by contact under synthesis reaction conditions of temperature and pressure with a synthesis gas consisting essentially of hydrogen and carbon monoxide and containing a high molar ratio of $H_2$ to CO, at least about 1.8:1 and preferably above 2:1.

The catalyst is composed of solid particles of reduced iron produced for example by the hydrogen reduction of an iron oxide such as magnetite or the like. It is, as stated, a fresh catalyst, which has not been previously used for the synthesis of hydrocarbons or other process which tends to deposit carbon, and is, therefore, essentially free of carbon, which impairs the conditioning and prevents realization of the important advantages of the present invention.

The conditioning step is continued for at least about one hour and preferably at least 10 hours, but advantageously not greater than about 24–36 hours. Thereafter, the low hydrogen feed gas is fed continuously into contact with the conditioned catalyst at an elevated temperature and pressure to produce increased yields of liquid hydrocarbons.

Advantageously, a substantial amount of water vapor is continuously added to the low hydrogen feed gas during the settled, on-stream operation subsequent to catalyst conditioning, in a quantity equal to from approximately 1–10 mol per cent on the basis of the combined $H_2$ and CO fed to the reactor.

It is particularly contemplated operating on an essentially self contained basis by recovering from the tail gases of the synthesis reaction, a stream consisting essentially of hydrogen, namely, a substantially high purity hydrogen gas for continuous admixture with a branched-off portion of the low $H_2$/CO synthesis gas feed to form the relatively high $H_2$/CO molar ratio synthesis gas for catalyst pretreatment and conditioning. However, the recovered stream of hydrogen, prior to adjusting the $H_2$/CO ratio of the conditioning gas, may, advantageously, be passed in contact with fresh oxidic catalyst for placing it in reduced condition prior to conditioning. Thus, the fresh oxide of iron is first reduced to the elemental metal by the hydrogen stream recovered from the tail gas from the hydrocarbon synthesis step, and the residual hydrogen from the reduction step, together with hydrogen direct from tail gas recovery, if desired, passes into admixture with a branched-off portion of the synthesis feed gas to raise the $H_2$/CO ratio thereof. In this way, the various treatment streams are continuously available within the confines of the synthesis operation.

The process of the present invention results in inhibiting objectionable carbon formation in or upon the catalyst, which hitherto has impaired operation and materially decreased catalyst life. When the synthesis feed gas supplied to the reactor contains not more than 0.3–1.3 mols of $H_2$ per mol of CO, the tendency for carbon formation is so great as to cause the catalyst to swell to as much as 45 times its original volume and thus pass out of the reactor.

The carbon formation moreover interferes with maintenance of uniform temperatures and, therefore, temperature control becomes increasingly difficult. The process of the present invention obviates this problem by minimizing carbon formation during continuous operation. As a result, the amount of liquid hydrocarbon fractions yielded by a given quantity of catalyst is materially increased, and current yield are likewise at a maximum.

For example, a catalyst pretreated in accordance with the present invention and placed on stream with a low $H_2$/CO feed has been found to yield 50% more $C_3^+$ fractions of liquid hydrocarbon than the same catalyst simply reduced and used directly for production of liquid fractions with an identical low ratio of $H_2$/CO synthesis gas.

It has been hitherto proposed to condition either previously used or fresh catalyst with highly dilute mixtures of $H_2$ and CO constituting the tail gas withdrawn from the catalytic hydrocarbon synthesis operation. Such gases are not only restricted to relatively insignificant amounts of reactants remaining after the bulk of the reactant gas has been consumed in the reactor, but are diluted by large quantities of $CO_2$, methane and the like formed as by-products of the synthesis reaction. These diluents are objectionable from the standpoint that they induce substantial carbonization of catalyst which promotes further carbonization of the catalyst when placed on stream with a low $H_2/CO$ feed gas.

The actual objective of such proposals has been to lessen the activity of the catalyst prior to use with a high $H_2/CO$ molar feed gas, but this manifestly results in a corresponding decrease in hydrocarbon yield and does not materially avoid carbon formation.

In direct contrast, the present invention contemplates conditioning a fresh cataylst with a high $H_2/CO$ molar feed gas substantially free from diluents such as $CO_2$ and methane which adversely affect the catalyst during pretreatment, thereby yielding a catalyst of high activity for the formation of hydrocarbons at a decreased rate of carbon formation.

It has, moreover, been discovered in accordance with the present invention that with a catalyst conditioned as above, restriction of catalyst carbonization is absolutely minimized by the inclusion of small quantities of water vapor in the reactor feed. While injection of water vapor has been hitherto proposed in connection with operations using an unconditioned catalyst, such operations soon become impaired apparently due to the formation of adherent or waxy deposits on the catalyst. In any event, operation with a low ratio $H_2/CO$ feed gas frequently can be maintained no longer than 5-10 hours without such a serious impairment in temperature control that the reaction must be terminated.

A most surprising feature of the present invention is that, after conditioning as above, operation proceeds indefinitely with a low $H_2/CO$ ratio feed gas containing injected water vapor, substantially excluding carbon formation and resulting in continuous high yield of liquid hydrocarbons. Actually, the necessity for catalyst regeneration is thereby eliminated.

Reference herein to a synthesis gas or conditioning gas, consisting essentially of hydrogen and carbon monoxide, means a mixture of $H_2$ and CO which is essentially free from diluents as above intimated. This contemplates mixtures containing not more than minor accompanying impurities of other gas and, at the most, not more than about 10% of any diluent such as $CO_2$ and/or the light hydrocarbon gases such as methane. The conditioning gas possesses an $H_2/CO$ ratio in the range of 1.8:1 to 5:1, preferably not greater than about 3.5:1.

After conditioning, the catalyst is subjected to contact with a fresh feed composed essentially of $H_2$ and CO in a molar ratio from about 0.3:1 to about 1.3:1 and at the most, not greater than about 1.5:1.

Both the conditioning and final settled operations are carried out at temperatures at which the catalyst is active, namely, temperatures in the range of about 500–700° F. and at pressures of 100 p. s. i. g. and higher, preferably in the range of about 150–450 p. s. i. g. Advantageously, the preconditioning temperatures and pressures closely approximate those of the final settled reaction so that the pretreatment takes place essentially under final reaction conditions.

As has also been previously indicated, when the conditioning is carried out in temperatures at which the catalyst possesses high activity for the production of $C_3^+$ hydrocarbons, then the catalyst becomes adequately conditioned in only a few hours, as for example, 10-24 hours. Pretreatment for periods in excess of 36 hours usually does not improve catalyst properties and tends to result in a gradual impairment.

In order to describe the invention in greater detail, reference is had to the attached flow sheet showing one preferred embodiment of the invention.

In this arrangement, a relatively low hydrogen synthesis gas, as above, from any source, not shown, enters the system through line 10. The bulk of the synthesis gas, consisting essentially of $H_2$ and CO in the relative molar ratio between about 0.3:1 and about 1.3:1 is injected into conduit 11 wherein it either continuously or periodically picks up previously conditioned catalyst from standpipe 12 and thence flows into the bottom of synthesis reactor 14.

Reactor 14 contains a mass of preconditioned catalyst in a condition of dense phase fluidization, and is provided with tubular heat exchange surfaces, not shown, for maintaining a regulated reaction temperature. The heat exchange tubes may be maintained at predetermined temperatures by internal circulation of a suitable coolant as is known. Other temperature controls may be substituted, however.

The fluidized, solid particle catalyst rises to any predetermined level in the reactor 14 forming a pseudo liquid upper surface from which the fluid gasiform products of reaction disengage and are withdrawn from pipe 15 via filters, cyclones or any other separating means for removing entrained particles.

Continuing through pipe 15 the gasiform effluent passes condenser 16 into separator 17 from which aqueous condensate is removed as at 18, and normally liquid hydrocarbons withdrawn as in 20. The overhead normally gaseous fractions pass through pipe 21 into header 22 from which a portion may be vented, as indicated, and a further portion recycled to the reactor 14 through branch line 23.

A further portion of the normally gaseous fraction passes through pipe 22 to hydrogen recovery system 24 for separation of a substantially pure stream of hydrogen.

One suitable hydrogen recovery system is the so-called hypersorption process wherein hydrogen is recovered by selective adsorption of undesired components in a moving bed of activated carbon. However, the specific type of gas separation process employed, forms, per se, no part of the present invention, and, therefore, may comprise any of the available separation methods. For example, the tail gas stream may be reacted at a high temperature with restricted quantities of molecular oxygen or other oxidizing agent, to consume the gaseous hydrocarbons and yield a mixture of hydrogen and carbon monoxide, which is afterward water-gas-shifted to form a mixture of $H_2$ and $CO_2$ from which the $CO_2$ is extracted by an adsorbent such as monoethanolamine or the like.

Referring now to the preparation of makeup catalyst for the synthesis reactor 14, a solid particle, powdered catalytic iron oxide enters catalyst reduction vessel 32 through standpipe 30, regulated by valve 31. The catalytic material comprises particles of iron oxide such as mill scale, bloom scale, Swedish magnetite, roasted iron pyrites or similar catalytic raw material.

The separated stream of hydrogen flows through pipe 26 into the bottom of the reduction zone 32 preferably at a rate sufficient to maintain the particles in a uniform state of dense fluidization. Reduction temperatures of about 400–

1,000° F. or higher are maintained in the vessel 32 by exchangers, not shown, sufficient to effect reduction of the solid oxidized particles.

The effluent gases in the upper portion of the reducing chamber 34 comprising residual hydrogen and water vapor are withdrawn through pipe 34 and may be vented in whole or in part from pipe 33, but are preferably conducted through cooling exchanger 35 into decanter 36 from which condensed water is removed as at 37. The substantially pure, dry, stream of hydrogen moves through pipe 38 and branch pipe 39 into the lower portion of the catalyst conditioning zone 40.

As indicated, reduced catalyst from vessel 32 is supplied to the conditioning chamber 40 through standpipe 41 controlled by valve 42, to feed reduced iron particles as required.

The feed to the conditioning zone 40, in addition to the hydrogen stream from pipe 38, comprises a branched-off portion of the fresh feed synthesis gas withdrawn from inlet pipe 10 into branch pipe 44. Also, a portion of the hydrogen in pipe 26 may by-pass catalyst reduction via branch pipe 43. Mixture of the hydrogen from pipes 38 and 43 with the fresh synthesis gas from pipe 44 takes place in pipe 39 to yield a gas containing the relatively high $H_2$/CO ratio conditioning feed.

For example, with a substantially pure, fresh synthesis gas feed composed of equal parts of $H_2$ and CO, one additional part of pure hydrogen will result in a 2:1 $H_2$/CO mixture. The resulting feed gas passes upwardly through a dense fluid phase of reduced catalyst in vessel 40 at a temperature and pressure at which the catalyst is activated, as previously described.

Temperature may be regulated in the reactor 40 in the same manner as the main reactor 14, and the effluent reaction products are withdrawn via pipe 46 to condenser 47 or separator 48.

Liquid hydrocarbon is discharged from separator 48 at pipe 49, and aqueous condensate at pipe 50. Overhead residual gases from the separator flow through pipe 52 from which a portion may be vented as at 54. The remainder passes through pipe 55 into header 22.

Water vapor or steam is supplied to reactor 14 from any convenient source, not shown, through pipe 57.

Therefore, the products of the system continuously afford a substantially pure hydrogen stream to effect the required catalyst reduction and subsequent fresh catalyst conditioning with a high purity charge gas containing at least about 2 mols of hydrogen per mol of CO.

As previously indicated, the quantity of catalyst under conditioning is preferably equivalent to the current make-up requirements. Inasmuch as there is always a more or less inevitable entrainment of particles out of the reactor, in a fluid system some make-up is necessary for continuous operation. Where catalyst losses of this character are maintained at a low value, the addition of conditioned catalyst may be necessary only at intervals. However, it is contemplated, where desired, operating with a continuous, but small, feed of conditioned catalyst particles from the conditioning to the final reaction zones.

In order to illustrate on operating embodiment of the invention in greater detail, a fresh magnetite hydrocarbon synthesis catalyst containing about 1.5% $K_2O$ was completely reduced at about 1,000° F. with a stream of pure hydrogen, and thereafter was placed in a hydrocarbon synthesis reactor supplied with a synthesis gas consisting of $H_2$ and CO in the molar ratio of 2:1 at a temperature of 650° F. for 24 hours. During this time, the effluent gases were withdrawn and treated for the recovery of substantial quantities of contained liquid hydrocarbons.

After conclusion of the foregoing treatment, the thus treated catalyst was placed on stream with a fresh feed synthesis gas consisting of hydrogen and carbon monoxide in approximately equal molar proportions. The catalyst was maintained in fluidized condition by the upflow of reactants, and the gasiform effluent, after withdrawal from the catalyst and removal of contained normally liquid fractions, was recycled to the reactor inlet at a 2:1 recycle rate on the basis of the fresh feed stream.

In a comparative run, the fresh magnetite was subjected to reduction as before, and thereafter placed immediately on stream with the 1:1 $H_2$/CO fresh feed under the same operating conditions of temperature, recycle rate, and the like.

In a yet further pair of comparative runs operations were carried out identically as in the respective foregoing runs except that the final on-stream operation with the low $H_2$/CO feed, was accompanied by the continuous injection of steam into the feed entering the reactor inlet at a rate equal to about 7% by volume on the basis of the total $H_2$ and CO supplied to the reactor.

The following table lists the comparative results of the four runs mentioned above giving the respective yields of hydrocarbons and by-product carbon dioxide and water vapor, as well as the condition of the catalyst at the end of the indicated period of operation. In the table, run A signifies the second mentioned run wherein the catalyst was placed directly on-stream without water vapor injection and without prior conditioning. Run B refers to the first mentioned run with prior conditioning of the catalyst but without steam injection. Run C lists the data from the run employing water vapor injection and an unconditioned catalyst. Run D gives the results of the run with water vapor injection and using the prior conditioned catalyst.

| Run | A | B | C | D |
|---|---|---|---|---|
| Yields, gm./m.$^{-3}$ | | | | |
| $C_3$+ | 84 | 123 | 117 | 122 |
| $C_1$–$C_2$ | 39 | 44 | | |
| $CO_2$ | 297 | 352 | | 386 |
| $H_2O$ | 65 | 95 | | 59 |
| $H_2$ and CO disappearance, percent | 68 | 89 | 66 | 81 |
| Vol. Percent Catalyst increase | 4,500 | 1,400 | (1) | 125 |
| After hours | 58 | 48 | ²5 | 79 |

¹ Wax formation tending to agglomerate catalyst.
² Forced to shut down—inoperable due to catalyst agglomeration.

These data under "$C_3$+ yield" significantly disclose a sharp increase in yield of normally liquid hydrocarbon fraction for both runs B and D using the fresh catalyst conditioned by the relatively high $H_2$/CO ratio fresh feed synthesis gas. It is to be noted also that the actual consumption of $H_2$ and CO in the reactor was materially higher in these runs than in the comparative runs A and C.

Of even greater significance, however, is the suppression of carbon formation shown for run B over run A, and particularly for run D over all the other runs.

Moreover, while water vapor added in run C with the unconditioned catalyst resulted in a $C_3$+ yield almost equal to that of runs B and C, the reactant consumption was relatively low, and after a period of only 5 hours of operation, the run became inoperable due to waxy formation on the catalyst which had the effect of agglomerating the particles and preventing temperature control.

It is to be particularly noted in accordance with run D that after preconditioning of the catalyst, water vapor injection was no longer objectionable from the standpoint of waxing the catalyst and was carried out beyond the time periods of the other runs with only an insignificant increase in catalyst volume.

From the data thus recorded it is apparent that the conversion of reactants into desired products is not only improved by pre-treatment of the catalyst but that such pre-treatment permits the inclusion of substantial quantities of water vapor in the reactor feed with the result that carbon formation is minimized, yields of desired products are materially increased and a continuous operation for long, indefinite periods realized.

As above intimated, the catalyst preferably comprises small portions, e. g., 0.2–5.0% of the usual activators, promoters and/or modifying agents, such as the alkali or alkaline earth metals, alumina, titanium oxide, thorium oxide, and many others. The catalyst particle size may vary widely and in the case of dense fluid phase operation particularly contemplated, may range about 60–400 mesh and finer, preferably about 100–325 mesh.

Instead of conducting normally gaseous effluent from the conditioning zone to the hydrogen recovery plant 24, this stream may be injected into the inlet of the synthesis zone 14. In the relatively small proportions involved, this stream has little effect upon the feed to the main reaction zone but indirectly, to the extent that it is not converted therein, finds its way to the hydrogen recovery plant.

While dense fluid phase operation has been discussed it is contemplated employing other desired contacting, as for example, fixed bed, moving bed or suspensoid system of operation.

The present invention is also applicable in connection with the synthesis of hydrocarbons by the slurry technique wherein the catalyst is suspended in an oil and the reactant gases passed upwardly therethrough. The suspending fluid may be a fraction of the synthesis product, e. g., a gas oil cut, a mineral oil or other hydrocarbon fraction which remains liquid under operation conditions. Pre-treatment of catalyst for the slurry operation may be carried out as a dense fluid phase operation followed by slurrying of the conditioned particles for subsequent use. Alternatively, the particles in an oil prior to pre-treatment may be slurried by suspension. The pre-treatment conditions, in either case, are otherwise the same.

Obviously, many modifications and variations of the invention as above set forth may be made without departing from the spirit and scope thereof, and, therefore, only such limitations should be imposed as are indicated in the appended claims.

I claim:

1. In the catalytic synthesis of normally liquid hydrocarbons from a hydrogen lean synthesis gas containing from about 0.3:1 to not more than about 1.3:1 mol of $H_2$ per mol of CO wherein said synthesis gas containing about 1–10 mol per cent of added water vapor on the basis of the total mols of $H_2$ and CO fed, is passed in contact with an iron hydrocarbon synthesis catalyst under reaction conditions effective to cause substantial conversion of the reactants into normally liquid hydrocarbon products, said operation normally resulting in the formation of waxy material on the catalyst which tends to agglomerate the catalyst and terminate the reaction, the improvement which comprises inhibiting said wax formation by conditioning a fresh, reduced iron hydrocarbon synthesis catalyst by contact with a stream of synthesis gas consisting essentially of $H_2$ and CO in a molar ratio in the range of 1:8:1 to 5:1 under reaction conditions such that substantial conversion takes place with the formatio of liquid hydrocarbons, continuing said conditioning for a substantial period of time in the range of about 1–36 hours and thereafter subjecting said catalyst to contact with said hydrogen lean synthesis gas under said reaction conditions in the presence of 1–10 mol per cent of added water vapor for the continuous production of normally liquid hydrocarbons without wax formation.

2. The method according to claim 1 wherein the conditioning is effected with a mixture consisting essentially of $H_2$ and CO in a molar ratio in the range of 1.8:1 to 3.5:1.

3. The method according to claim 1 wherein the conditioning is effected for a period of time ranging from about 10–24 hours.

References Cited in the file of this patent

UNITED STATES PATENTS

| Number | Name | Date |
|---|---|---|
| 2,461,570 | Roberts | Feb. 15, 1949 |
| 2,541,677 | Sumerford et al. | Feb. 13, 1951 |
| 2,560,344 | Hemminger | July 10, 1951 |
| 2,562,806 | Mayer | July 31, 1951 |